(12) United States Patent
Hunt et al.

(10) Patent No.: US 10,897,365 B1
(45) Date of Patent: *Jan. 19, 2021

(54) MID-SPAN AUTOMATIC TRANSFER SWITCH FOR POWER OVER ETHERNET LIGHTING AND POWERED DEVICES

(71) Applicant: Nova Energy & Automation, LLC, Milwaukee, WI (US)

(72) Inventors: Douglas R. Hunt, Milwaukee, WI (US); Anthony H. Sessions, Milwaukee, WI (US)

(73) Assignee: NOVA ENERGY & AUTOMATION, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/000,291

(22) Filed: Aug. 22, 2020

Related U.S. Application Data

(63) Continuation-in-part of application No. 16/776,916, filed on Jan. 30, 2020, now Pat. No. 10,754,403.

(51) Int. Cl.
  *G06F 1/26* (2006.01)
  *H04L 12/10* (2006.01)
  *H02J 9/06* (2006.01)

(52) U.S. Cl.
  CPC .............. *H04L 12/10* (2013.01); *G06F 1/266* (2013.01); *H02J 9/061* (2013.01)

(58) Field of Classification Search
  CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
  See application file for complete search history.

(56) References Cited

U.S. PATENT DOCUMENTS

| | | | |
|---|---|---|---|
| 7,498,692 B2 | 3/2009 | Grolnic et al. | |
| 9,444,255 B2* | 9/2016 | Rutherford | ....... H02J 13/00028 |
| 10,218,216 B2 | 2/2019 | Kanarellis et al. | |
| 2006/0186739 A1 | 8/2006 | Grolnic et al. | |

* cited by examiner

*Primary Examiner* — Zahid Choudhury
(74) *Attorney, Agent, or Firm* — Donalo J. Ersler

(57) ABSTRACT

An automatic transfer switch for power over ethernet lighting and powered devices preferably includes at least one transfer switch module, a carrier board, a power supply and a housing. Each transfer switch module preferably includes a plurality of input transformers, a plurality of output transformers, a microcontroller, a power source equipment device, a power transfer device, a LAN Multiplexer and a PoE power monitor. The at least one transfer switch module is retained on the carrier board. The plurality of input transformers receive power and data inputs from power sourcing equipment. If a backup power switch detects a loss of power, a signal will be received by the microcontroller of the at least one transfer switch module. The microcontroller will instruct the power transfer device to supply electrical power to the plurality of output transformers. Data will also be supplied by the microcontroller to the LAN Multiplexer.

19 Claims, 4 Drawing Sheets

MID-SPAN AUTOMATIC TRANSFER SWITCH FOR POWER OVER ETHERNET LIGHTING AND POWERED DEVICES

CROSS-REFERENCES TO RELATED APPLICATIONS

This is a continuation-in-part patent application taking priority from U.S. Pat. No. 10,754,403 issued on Aug. 25, 2020, having application Ser. No. 16/776,916 and filed on Jan. 30, 2020.

BACKGROUND OF THE INVENTION

1. Field of the Invention

The present invention relates generally to lighting and more specifically to a mid-span automatic transfer switch for power over ethernet lighting and powered devices, which not only provides power from a backup source, but also provides data for operating a plurality of lighting devices and/or powered devices.

2. Discussion of the Prior Art

Architects and engineers are specifying power over ethernet (PoE) lighting for use in all areas of new construction projects. There are many benefits associated with this technology. The primary benefit is that data and power are delivered over one CAT 5e/CAT6 cable. The power levels provided are considered low voltage and therefore do not require an electrician to perform the installation. This reduces the installation cost to a building owner and can be completed in less time.

There is also an inherent safety benefit with PoE installations in that the power sourcing equipment, when detecting a disconnected luminaire, shuts off power preventing the possibility of a spark which could ignite a fire. PoE luminaires (lighting devices) are also being installed in areas of a building that require emergency lighting. Emergency lighting is required in egress paths per national and local codes and standards. Egress lighting is required to guide people safely out of a building in times of emergency. However, as previously mentioned, when the power sourcing equipment loses power it will also remove power to the luminaire.

Lighting manufacturers have addressed this issue by installing batteries in each luminaire that is defined as being part of the "emergency lighting" system. The downside to this method is that batteries require maintenance and replacement over time. This is very expensive when you consider the labor required to maintain (by checking the charge on each battery in) the egress lighting system.

Additionally, there are also code requirements for an emergency luminaire to be used for normal task lighting and to also be used as emergency lighting. This requires all components in the emergency lighting circuit to be tested by a National Recognized Testing Lab (NRTL), typically to UL's UL 924, "UL Standard for Safety Emergency Lighting and Power Equipment".

Patent publication no. 2006/0186739 to Grolnic et al. discloses a power over ethernet battery backup. Patent no. 7498692 to Grolnic et al. discloses power over ethernet battery backup. Patent no. 10218216 to Kanarellis et al. discloses a system and method for supplying uninterruptible power to a PoE device in a powered state.

Accordingly, there is a clearly felt need in the art for a mid-span automatic transfer switch for power over ethernet lighting and powered devices, which not only provides power from a backup source, but also provides data for operating the plurality of lighting and/or powered devices, and eliminates the necessity for individual batteries for each lighting and/or powered devices.

SUMMARY OF THE INVENTION

The present invention provides a mid-span automatic transfer switch for power over ethernet lighting and powered devices, which not only provides power from a back-up source, but also provides data for operating a plurality of lighting and/or powered devices. The mid-span automatic transfer switch for power over ethernet lighting and powered devices (mid-span automatic transfer switch) preferably includes at least one transfer switch module, a carrier board, a power supply and a housing. Each transfer switch module preferably includes a plurality of input transformers, a plurality of output transformers, a microcontroller, a power source equipment device, a power transfer device, a PoE power monitor and a LAN Multiplexer. Further, each transfer switch module preferably includes an input from a fire alarm, the power backup power switch and a manual test switch. The plurality of input transformers receive a power input and a data input through an input connector. The power transfer device includes a plurality of relays, which are controlled by the microcontroller. If a backup power switch or the PoE power monitor detects a loss of power, a signal will be sent to a carrier microcontroller on the carrier board and concurrently to at least one transfer switch module. The carrier microcontroller will send a parallel backup signal to the microcontroller of the at least one transfer switch module. The microcontroller will instruct the power transfer device to switch the plurality of relays to supply electrical power from the power sourcing equipment device and instruct the LAN multiplexer to provide data through a second input thereof to the plurality of output transformers instead of power and data from the plurality of input transformers.

The carrier microcontroller includes a wireless communication system and wired communication interface. The wireless communication system provides an RF output of automated diagnostics and reporting. The communication system is connected to an emergency power and a building management system. The building management system controls heating, cooling and lighting systems in a building. If any condition occurs that does not allow the mid-span automatic transfer switch to operate, the microcontroller outputs a signal (derangement signal) to a notification device. The communication system is also connected to the emergency power. The carrier microcontroller is also connected to a backup power switch.

The LAN Multiplexer receives data input from the plurality of input transformers through a first input. However, the output of the power transfer device may also be connected to an input of a PoE power monitor. An output of the PoE power monitor is connected to an input of the output transformers. If a loss of voltage or current occurs in an output of one of the input transformers, or if an output from the power sourcing equipment device fails, a message is sent to the microcontroller of the failure occurring in either the input transformer or power sourcing equipment device. The PoE power monitor operates in both normal (pass through) mode or in emergency (bypass) mode. Bilateral communication exists between the power sourcing equipment device and the microcontroller.

The microcontroller is programmed with data to enable each lighting device and/or other powered device to be operated if electrical power from a utility company ceases. An output of the microcontroller is connected to an input of an ethernet physical interface. An output of the ethernet physical interface is connected to a second input of the LAN Multiplexer. The LAN Multiplexer will receive a signal from the microcontroller that there is a loss of power and data from the plurality of input transformers and switch to the second input to receive data from the ethernet physical interface. The power supply supplies the carrier board with electrical power. The power supply is connected to the back-up power switch. The back-up power switch receives electrical power from an emergency power source or from utility power. If the utility power ceases, the back-up power switch receives power from the emergency power source. The carrier board with the at least one transfer switch module and the power supply are preferably retained in the housing. However, the power supply may be located outside the housing.

An output of the plurality of output transformers are connected to a plurality of output connectors. A plurality of lighting and powered devices are connected to the plurality of output connectors. The power supply of the mid-span transfer switch is connected to the back-up power switch. The back-up power switch is connected to the emergency power source and utility power. If the utility power ceases, the back-up power switch receives power from the emergency power source. The power supply powers the carrier board, which sends power to the power sourcing equipment device, the LAN Multiplexer and the microcontroller in each transfer switch module. If the utility power ceases or the PoE power monitor detects a loss of voltage or current from one of the outputs of the plurality of input transformers, the power sourcing equipment device provides power to the plurality of output transformers. The microcontroller sends data signals to the LAN Multiplexer, which replace data received from the ethernet switch. A lighting and/or powered device connected to one of the plurality of output connectors will receive electrical power and data to operate.

However, the carrier board and optionally the carrier microcontroller may be eliminated and the at least one transfer switch module may be retained on a single circuit board.

Accordingly, it is an object of the present invention to provide a mid-span automatic transfer switch, which not only provides power from a backup source, but also provides data for operating the plurality of lighting and powered devices, and eliminates the necessity for individual batteries for each lighting and/or powered devices.

These and additional objects, advantages, features and benefits of the present invention will become apparent from the following specification.

DETAILED DESCRIPTION OF THE PREFERRED EMBODIMENTS

Figure 1:
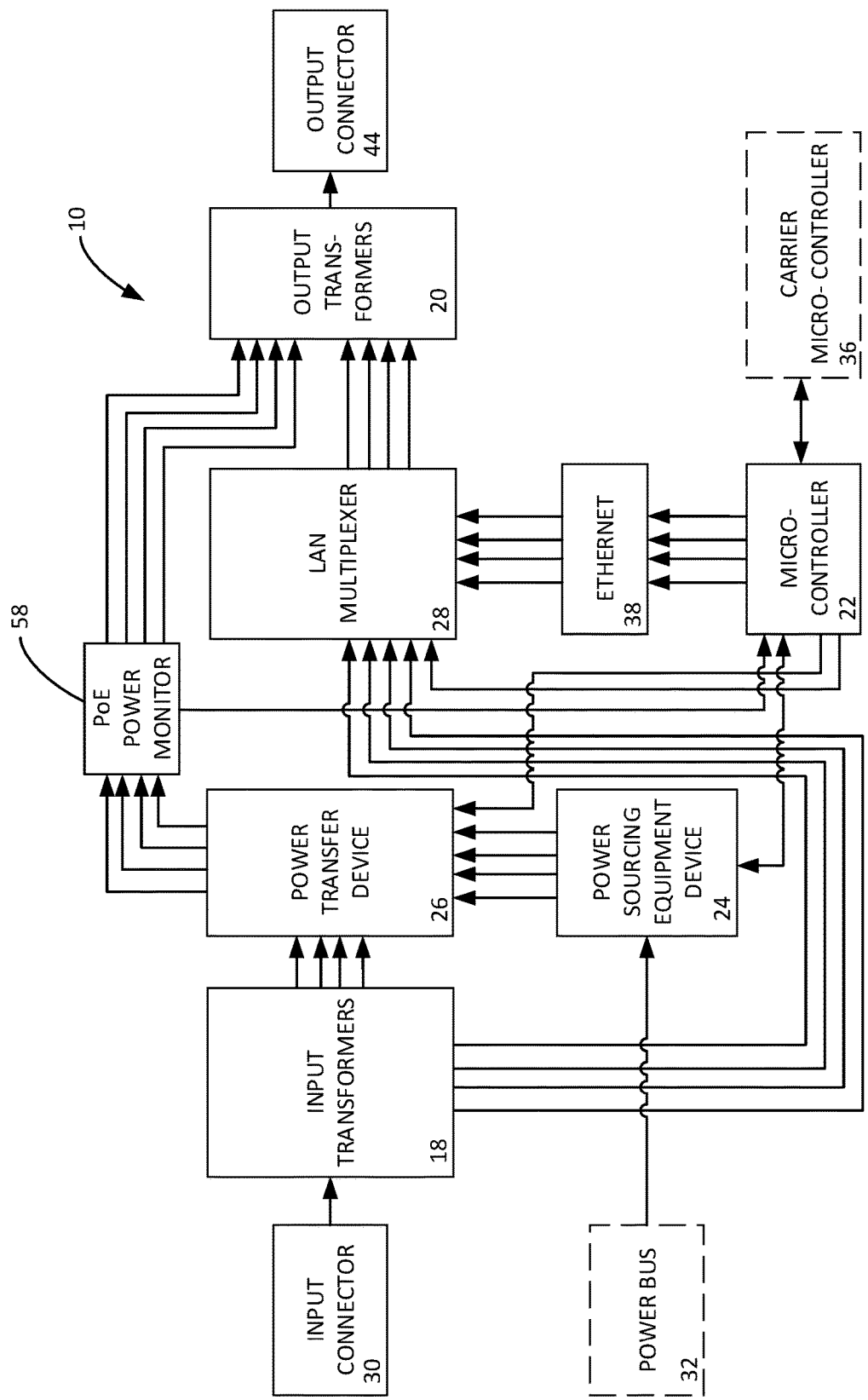
FIG. 1 is a schematic diagram of a transfer switch module of a mid-span automatic transfer switch in accordance with the present invention.
Figure 2:
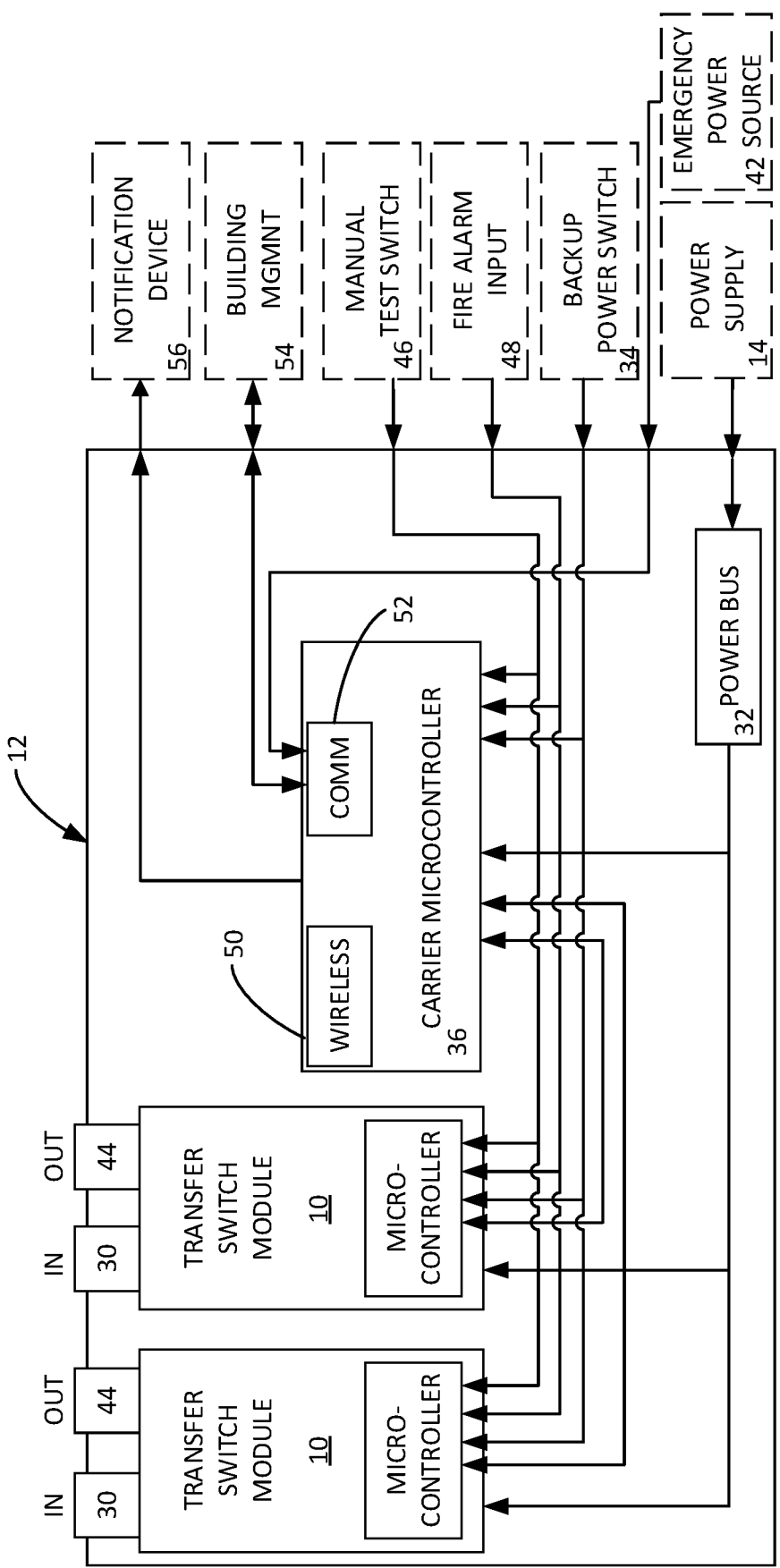
FIG. 2 is a schematic diagram of two transfer switch modules retained on a carrier board of a mid-span automatic transfer switch in accordance with the present invention.
Figure 3:
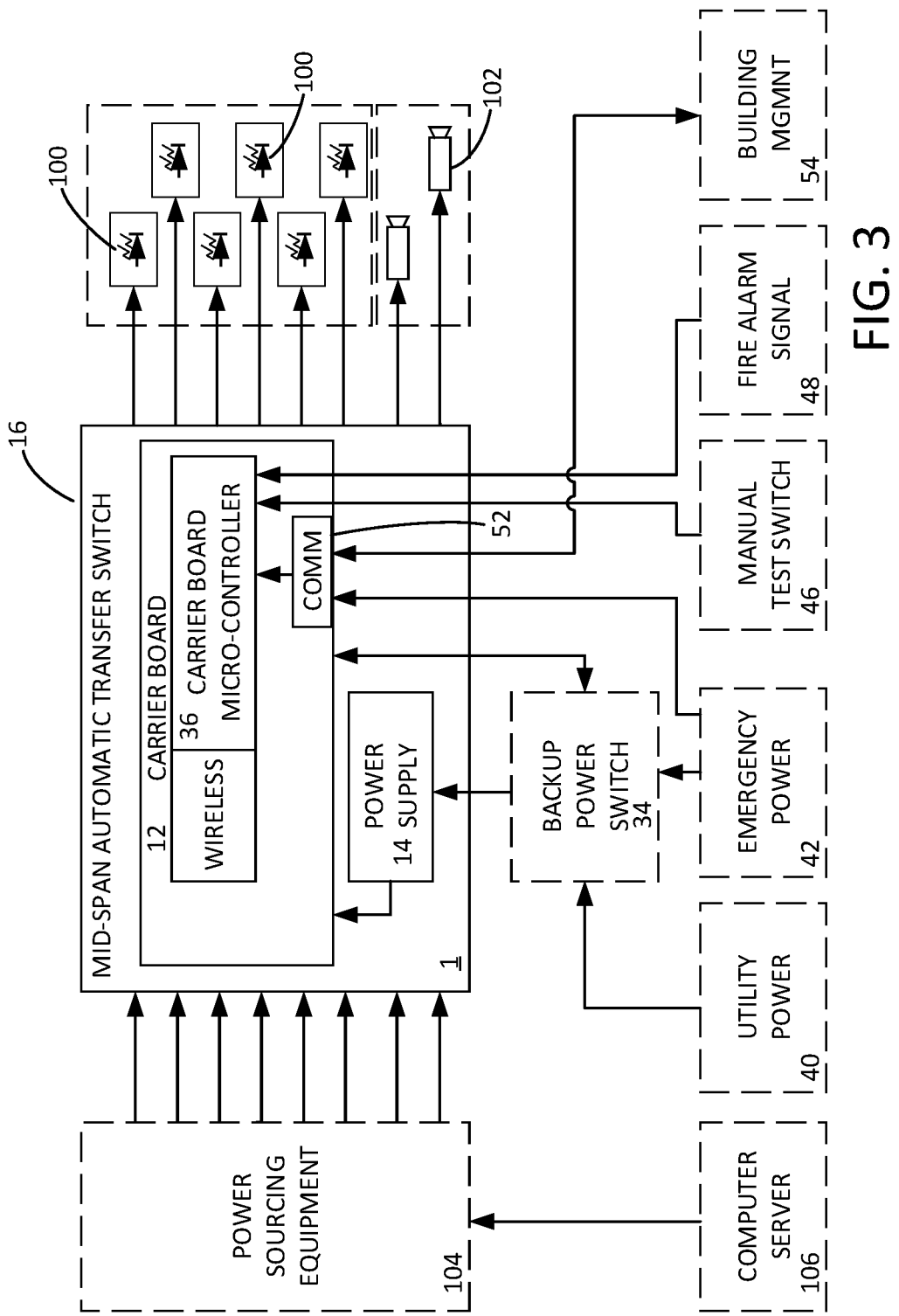
FIG. 3 is a schematic diagram of a mid-span automatic transfer switch receiving input from an ethernet switch and outputting power and data to a plurality of lighting and powered devices in accordance with the present invention.

With reference now to the drawings, and particularly to FIGS. 1 and 3, there is shown a transfer switch module 10 of a mid-span automatic transfer switch 1. With reference to FIG. 2, the mid-span automatic transfer switch 1 preferably includes at least one transfer switch module 10, a carrier board 12, a power supply 14 and a housing 16. Each transfer switch module 10 preferably includes a plurality of input transformers 18, a plurality of output transformers 20, a microcontroller 22, a power source equipment device 24, a power transfer device 26 and a LAN Multiplexer 28. Further, each transfer switch module 10 preferably includes an input from a fire alarm 48, the power backup power switch 34 and a manual test switch 46. The plurality of input transformers 18 receive a power input and a data input through an input connector 30 from power sourcing equipment 104. Power from a center tap of a primary coil of the plurality of input transformers 18 is connected to the power transfer device 26.

An output of the power sourcing equipment device 24 is also connected to the power transfer device 26. The power sourcing equipment device 24 receives electrical power from a power bus 32 located on the carrier board 12. The power bus 32 is connected to the power supply 14. The power transfer device 26 includes a plurality of relays, which are controlled by the microcontroller 22. If a backup power switch 34 detects a loss of power, a signal will be sent to a carrier microcontroller 36 on the carrier board 12 and to the microcontroller 22 on the at least one transfer switch module 10. The carrier microcontroller 36 will also send a parallel backup signal to the microcontroller 22 of the at least one transfer switch module 10. The microcontroller 22 will instruct the power transfer device 26 to switch the plurality of relays to receive power from the power sourcing equipment device 24, which will supply electrical power to a center tap of a secondary coil of the plurality of output transformers 20 through the plurality of relays in the power transfer device 26.

The carrier microcontroller 36 includes a wireless communication system 50 and wired communication interface 52. The wireless communication system 50 provides an RF output of automated diagnostics and reporting. The communication system 52 is connected to an emergency power source 42 and a building management system 54. The building management system 54 controls heating, cooling and lighting in a building. If any condition occurs that does not allow the mid-span automatic transfer switch 1 to operate, the microcontroller 36 outputs a signal (derangement signal) to a notification device 56. The carrier microcontroller 36 is also connected to a manual test switch 46 and power backup switch 34.

The output of the power transfer device 26 may also be connected to an input of a PoE power monitor 58. An output of the PoE power monitor 58 is connected to an input of the output transformers 20. If a loss of voltage or current occurs in an output of one of the input transformers 18, or if an output from the power sourcing equipment device fails, a message is sent to the microcontroller 22 that a failure has occurred in either one of the input transformers 18 or the power sourcing equipment device 24. The PoE power monitor 58 operates in both normal (pass through) mode or in emergency (bypass) mode. Bilateral communication exists between the power sourcing equipment device 24 and the microcontroller 22.

The microcontroller 22 must be programmed with data for each particular lighting device 100 or other powered device 102 to be operated, if electrical power from a utility power ceases. Each lighting device 100 or powered device 102 requires electrical power to operate, but also requires special data, which is stored in the microcontroller 22. The LAN Multiplexer 28 receives a first data input from the plurality of input transformers 18. A data supply output of the microcontroller 22 is preferably connected to an input of an ethernet physical interface 38. The ethernet physical interface 38 decodes and encodes a data signal from the microcontroller 22 and supplies multiple data signals to a second input of the LAN Multiplexer 28. The LAN Multiplexer 28 will receive a control signal from the microcontroller 22 that there is a loss of power and data. The microcontroller 22 sends the control signal, because the microcontroller 22 received a loss of power signal from the backup power switch 34 through the carrier board, or the PoE power monitor detected a loss of voltage or current from one of the outputs of the plurality of input transformers 18. It is assumed that a loss of electrical power produces a loss of data. The LAN Multiplexer will switch a plurality of solid state switches to receive data from the ethernet physical interface 38 instead of the plurality of input transformers 18. The microcontroller 22 is preferably programmed to provide the data through a User Datagram Protocol (UDP). The lighting device 100 and the powered device 102 include power supplies that convert input voltage to the correct operational voltage. The LAN Multiplexer 28 may be any suitable digital data switch.

The carrier microcontroller 36 of the carrier board 12 communicates with the microcontroller 22 of the at least one transfer switch module 10. The power bus 32 of the carrier board 12 supplies the carrier microcontroller 36 with electrical power and the at least one transfer switch module 10. The power supply 14 is connected to back-up power switch 34. The back-up power switch 34 receives electrical power from utility power 40 or from an emergency power source 42. The emergency power source 42 may be a generator, a battery, a UPS or any other suitable power source. If the PoE power monitor detects a loss of voltage or current from one of the outputs of the plurality of input transformers 18, or the power transfer device 26, the PoE power monitor will send a signal to the microcontroller 22. The microcontroller 22 will send a signal to the carrier microcontroller 36. The carrier microcontroller 36 may send a signal to the back-up power switch 34. The carrier board 12 with the at least one transfer switch module 10 and the power supply 14 are preferably retained in the housing 16. However, the power supply 14 may be located outside the housing 16.

Power and data outputs of power sourcing equipment 104 are connected to input connectors 30 of the mid-span automatic transfer switch 1. The power sourcing equipment 104 is controlled by a computer server 106. The power sourcing equipment 104 may be any suitable device, such as an ethernet switch. The ethernet switch could be a CISCO CDB-8U, CDB-8P or any other suitable ethernet switch. The plurality of lighting devices 100 and powered devices 102 are connected to the plurality of output connectors 44 of the mid-span automatic transfer switch 1. If the utility power 40 ceases, the back-up power switch 34 receives power from the emergency power source 42. The power supply 14 powers the carrier board 12 through the power bus 32, which sends power to the power sourcing equipment device 24 that powers the power transfer device 26, the LAN Multiplexer 28 and the microcontroller 22 in each transfer switch module 10. A functionality of the mid-span automatic transfer switch 1 may also be tested by use of a manual switch 46.

Figure 4:
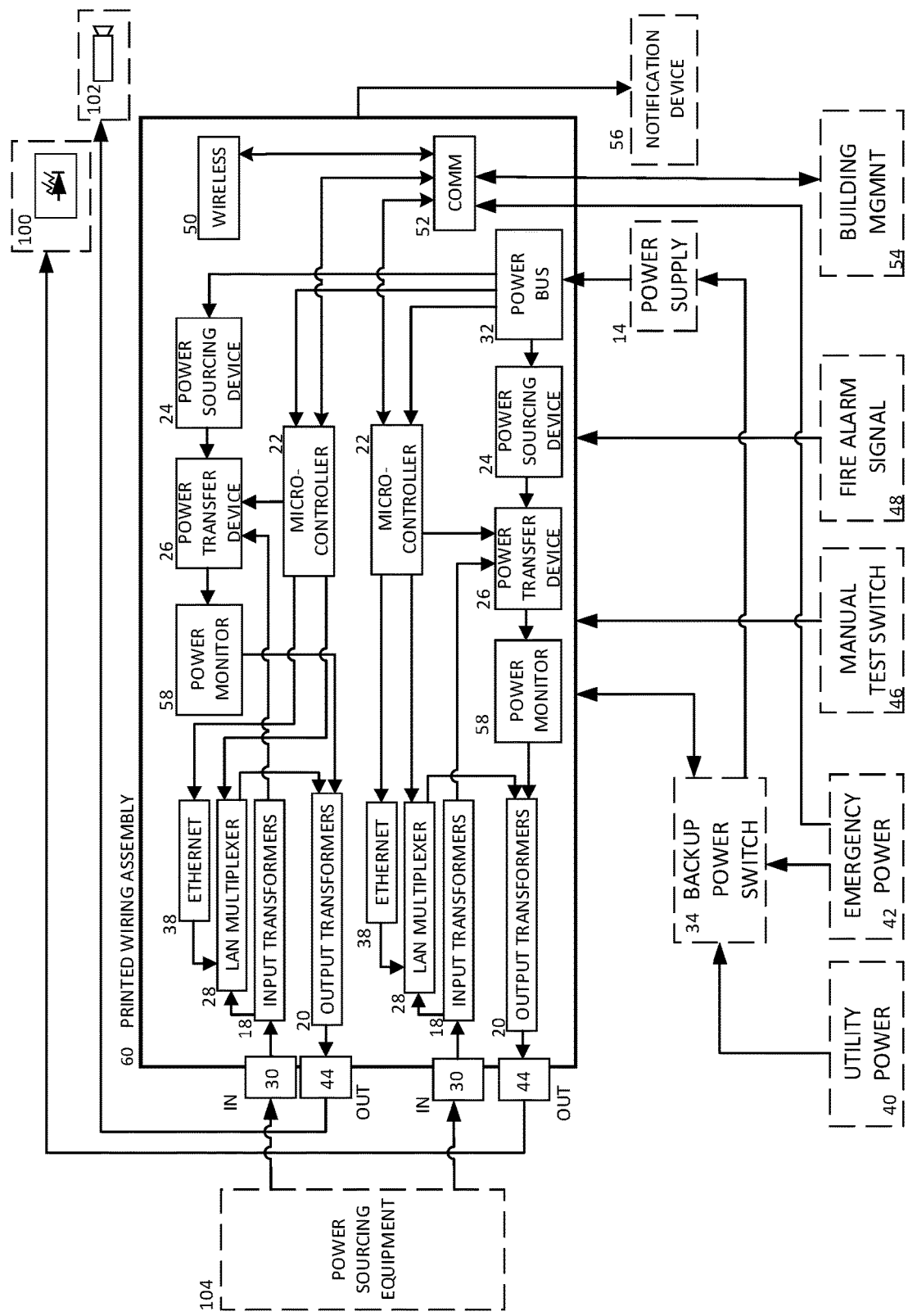
FIG. 4 is a schematic diagram of two transfer switch modules retained on a single circuit board of a mid-span automatic transfer switch in accordance with the present invention.

With reference to FIG. 4, the carrier board 12 and optionally the carrier microcontroller 36 may be eliminated and the at least one transfer switch module 10 may be retained on a single circuit board 60. The single circuit board 60 would communicate with the emergency power source 42, wireless communication system 50, the wired communication interface 52, building management 54 and the notification device 56.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A mid-span automatic transfer switch acts as a backup for power sourcing equipment to provide power and at least one backup data signal for power over ethernet lighting and powered devices, where a backup power switch detects a loss of utility power and switches to a source of emergency power in the event utility power is no longer available, comprising:

at least one transfer switch module includes a microcontroller, a power transfer device, a digital data switch and a PoE power monitor, the power supply provides power to said at least one transfer switch module, said PoE power monitor receives a plurality of signals from said power transfer device, said power transfer device receives an output from a plurality of input transformers, said PoE power monitor sends a signal to said microcontroller when a loss of at least one of voltage and current occurs, said microcontroller instructs said power transfer device to receive electrical power from a power sourcing equipment device instead of a plurality of input transformers, said microcontroller contains the at least one backup data signal for any device connected to said at least one transfer switch module, said microcontroller instructs said digital data switch to receive the at least one backup data signal from said microcontroller instead of the plurality of input transformers, wherein the power transfer device supplies a lighting device and a powered device with electrical power, said microcontroller supplies the at least one backup data signal to the lighting device and the powered device, the lighting device and the powered device both require electrical power and the at least one backup data signal to operate, one of the lighting device and the powered device is connected to said at least one transfer switch module.

2. The mid-span automatic transfer switch of claim 1, further comprising:

an ethernet physical interface receives a data signal from said microcontroller and supplies an output to said digital data switch.

3. The mid-span automatic transfer switch of claim 1 wherein:

said digital data switch is a LAN Multiplexer.

4. The mid-span automatic transfer switch of claim 1, further comprising:

a manual switch for testing a functionality of said mid-span automatic transfer switch.

5. The mid-span automatic transfer switch of claim 1 wherein:
the power sourcing equipment is an ethernet switch.

6. The mid-span automatic transfer switch of claim 1, further comprising:
a power sourcing equipment device receives power from the power supply and supplies power to said power transfer device.

7. The mid-span automatic transfer switch of claim 1 wherein:
the source of emergency power is external to the at least one transfer switch module.

8. A mid-span automatic transfer switch acts as a backup for power sourcing equipment to provide power and at least one backup data signal for power over ethernet lighting and powered devices, where a backup power switch detects a loss of utility power and switches to a source of emergency power in the event utility power is no longer available, a power supply is connected to said backup power switch, comprising:
a carrier board includes a carrier microcontroller; and
at least one transfer switch module includes a microcontroller, a power transfer device, a digital data switch and a PoE power monitor, said at least one transfer switch module is retained on said carrier board, said carrier microcontroller communicates with said microcontroller, the power supply provides power to said at least one transfer switch module, said PoE power monitor receives a plurality of signals from said power transfer device, said power transfer device receives an output from a plurality of input transformers, said PoE power monitor sends a signal to said microcontroller when a loss of at least one of voltage and current occurs, said microcontroller instructs said power transfer device to receive electrical power from a power sourcing equipment device instead of a plurality of input transformers, said microcontroller contains the at least one backup data signal for any device connected to said at least one transfer switch module, said microcontroller instructs said digital data switch to receive the at least one backup data signal from said microcontroller instead of a plurality of input transformers, wherein the power transfer device supplies a lighting device and a powered device with electrical power, said microcontroller supplies the at least one backup data signal to the lighting device and the powered device, the lighting device and the powered device both require electrical power and the at least one backup data signal to operate, one of the lighting device and the powered device is connected to said at least one transfer switch module.

9. The mid-span automatic transfer switch of claim 8, further comprising:
an ethernet physical interface receives a data signal from said microcontroller and supplies an output to said digital data switch.

10. The mid-span automatic transfer switch of claim 8 wherein:
said digital data switch is a LAN Multiplexer.

11. The mid-span automatic transfer switch of claim 8, further comprising:
a manual switch for testing a functionality of said mid-span automatic transfer switch.

12. The mid-span automatic transfer switch of claim 8 wherein:
the power sourcing equipment is an ethernet switch.

13. The mid-span automatic transfer switch of claim 8 wherein:
the source of emergency power is external to the at least one transfer switch module.

14. A mid-span automatic transfer switch acts as a backup for power sourcing equipment to provide power and at least one backup data signal for power over ethernet lighting and powered devices, where a backup power switch detects a loss of utility power and switches to a source of emergency power in the event utility power is no longer available, comprising:
at least one transfer switch module includes a plurality of input transformers, a plurality of output transformers, a microcontroller, a power transfer device, a digital data switch and a PoE power monitor, a power sourcing equipment device supplies power to said power transfer device, said power transfer device supplies electrical power to said plurality of output transformers during a loss of utility power, said PoE power monitor receives a plurality of signals from said power transfer device, said power transfer device receives an output from said plurality of input transformers, said PoE power monitor sends a signal to said microcontroller when a loss of at least one of voltage and current occurs, said microcontroller instructs said power transfer device to receive electrical power from a power sourcing equipment device instead of a plurality of input transformers, said microcontroller contains the at least one backup data signal for any device connected to said at least one transfer switch module, said microcontroller instructs said digital data switch to receive the at least one data signal from said microcontroller instead of a plurality of input transformers, wherein the power sourcing equipment device supplies a lighting device and a powered device with electrical power, said microcontroller supplies the at least one backup data signal to the lighting device and the powered device, the lighting device and the powered device both require electrical power and the at least one backup data signal to operate, one of the lighting device and the powered device is connected to said at least one transfer switch module.

15. The mid-span automatic transfer switch of claim 14, further comprising:
an ethernet physical interface receives a data signal from said microcontroller and supplies an output to said digital data switch.

16. The mid-span automatic transfer switch of claim 14 wherein:
said digital data switch is a LAN Multiplexer.

17. The mid-span automatic transfer switch for power over ethernet lighting and powered devices of claim 14, further comprising:
a manual switch for testing a functionality of said mid-span automatic transfer switch.

18. The mid-span automatic transfer switch of claim 14 wherein:
the power sourcing equipment is an ethernet switch.

19. The mid-span automatic transfer switch of claim 14, further comprising:
a power sourcing equipment device receives power from the power supply and supplies power to said power transfer device.

* * * * *